(12) United States Patent
Hirakata

(10) Patent No.: US 6,396,471 B1
(45) Date of Patent: *May 28, 2002

(54) COLOR LIQUID CRYSTAL DISPLAY DEVICE AND IMAGE DISPLAY METHOD THEREOF

(75) Inventor: Yoshiharu Hirakata, Kanagawa (JP)

(73) Assignee: Semiconductor Energy Laboratory Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/725,642

(22) Filed: Oct. 15, 1996

(30) Foreign Application Priority Data

Oct. 12, 1995 (JP) ............................................. 7-290374

(51) Int. Cl.$^7$ ................................................. G09G 3/36
(52) U.S. Cl. ........................ 345/104; 345/530; 345/594; 178/19.01
(58) Field of Search ............................... 345/104, 182, 345/173, 179, 174, 156, 157, 150, 186, 199, 188, 510, 352, 146, 145, 507; 178/158, 18.07, 18.01, 19.01, 19.03, 19.05

(56) References Cited

U.S. PATENT DOCUMENTS

| | | | | |
|---|---|---|---|---|
| 4,691,295 A | * | 9/1987 | Erwin et al. ................. | 345/188 |
| 4,757,309 A | * | 7/1988 | Bowater et al. ............ | 345/114 |
| 4,789,963 A | * | 12/1988 | Takahashi et al. .......... | 345/510 |
| 5,249,263 A | * | 9/1993 | Yanker et al. .............. | 345/431 |
| 5,424,754 A | * | 6/1995 | Bar et al. ................... | 345/150 |
| 5,448,024 A | * | 9/1995 | Kawaguchi et al. ..... | 178/18.07 |
| 5,610,629 A | * | 3/1997 | Baur .......................... | 345/104 |
| 5,717,432 A | * | 2/1998 | Miwa et al. ................ | 345/173 |
| 5,949,409 A | * | 9/1999 | Tanaka ....................... | 345/186 |

OTHER PUBLICATIONS

Tagawa et al., TFT–LCD Panel with a Function Detecting Pen Positions, Japan.

* cited by examiner

Primary Examiner—Richard Hjerpe
Assistant Examiner—Francis Nguyen
(74) Attorney, Agent, or Firm—Fish & Richardson, P.C.

(57) ABSTRACT

There is disclosed a color liquid crystal display (LCD) device capable of displaying color images in response to direct entry of input data and/or instructions through operation of an associated coordinate pointing tool. Typically, this tool is a pen-like input device known as the "input pen" for use in determining the individual position for color display on the screen of a built-in LCD panel. A coordinate detector operates to recognize the position as designated by the input pen, generating and issuing an output signal indicative of the corresponding coordinate data. A color designator circuit designates a color as presently selected for color display. A memory device stores therein color data representative of the color designated. A memory controller is responsive to receipt of an address issued from the selected coordinate data for controlling the color data to be written into and read out of the memory. An output controller allows the color data read from the memory to be supplied to the LCD display screen as video data.

6 Claims, 5 Drawing Sheets

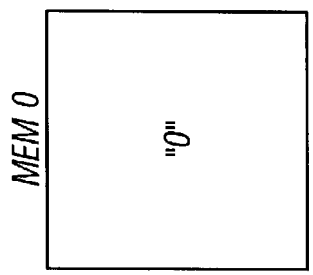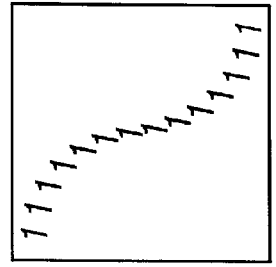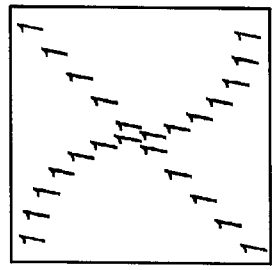
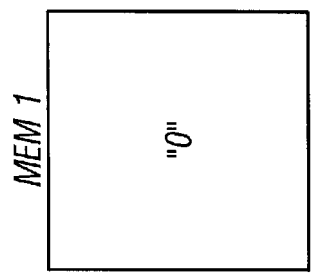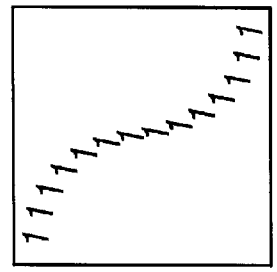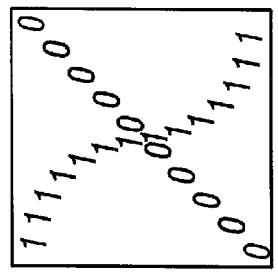
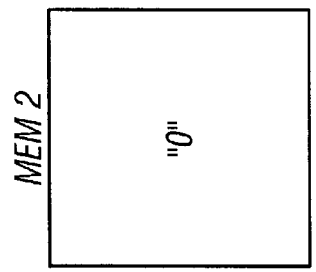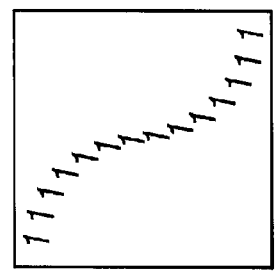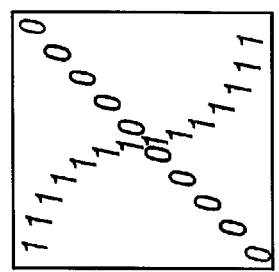
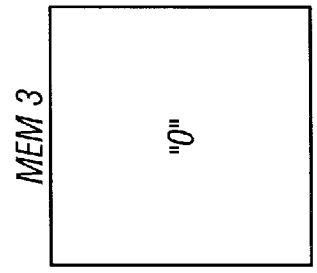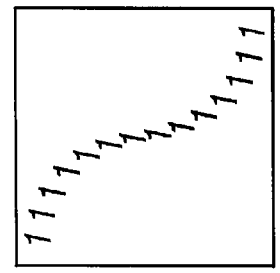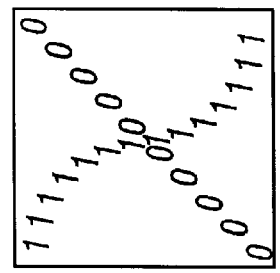
FIG. 3a    FIG. 3b    FIG. 3c

| MEM | | | | COLOR |
|---|---|---|---|---|
| 3 | 2 | 1 | 0 | |
| 0 | 0 | 0 | 0 | WHITE |
| 0 | 0 | 0 | 1 | RED |
| 0 | 0 | 1 | 0 | BLUE |
| 0 | 0 | 1 | 1 | GREEN |
| ⋮ | ⋮ | ⋮ | ⋮ | ⋮ |
| 1 | 1 | 1 | 0 | ⋮ |
| 1 | 1 | 1 | 1 | BLACK |

FIG. 4

COLOR LIQUID CRYSTAL DISPLAY DEVICE AND IMAGE DISPLAY METHOD THEREOF

BACKGROUND OF THE INVENTION

1. Field of the Invention

The present invention relates generally to liquid crystal display (LCD) devices, and more particularly to color LCD devices for use with a touch-sensitive pointing input device and an image display method thereof.

2. Description of the Prior Art

Through the trend of complexity in computerization as to diversity of information in the recent past, portable or "handheld" electronic information management tools including personal digital assistants (PDAs) have found increasing applications due to advantages such as small size and light weight. In the thrust to achievement of such advanced handheld information management tools, the pen-input scheme is becoming more important for permission of direct entry of input data or instructions by use of a touch-sensitive coordinate pointing input device known as a "pen" pointer in the art through an associated tough-screen display panel in such a simple and easy way that allows users to "write-down" by hand on a memo pad. As such pen-input scheme, several techniques have been proposed until today, including a technique of laminating a pen-input panel (tablet panel) on an associated display panel, a technique of common use of a display panel also as the tablet, and others.

One typical pen-input scheme incorporating the former technique has been disclosed in, for example, Published Unexamined Japanese Patent Application (PUJPA) No. 58-200384 and also in PUJPA No. 7-175591. With the prior art, an input tablet is constituted from two light transmissive substrates having lateral and longitudinal elongate electrodes for position detection. The substrates may be made of glass, polycarbonate or other polymer material. When the pen pointer is manually operated by users to draw a desired locus thereon while rendering the pen pressed onto the surface of the tablet at a tip end thereof, a coordinate detector circuit operates to sense or detect corresponding coordinates of a drawing position every time the coordinates change. A control circuit is responsive to receipt of such detected coordinates for providing adequate image data indicative of character set or graphics as pursuant to the coordinate detection result, allowing a resultant drawing image to be visually indicated on the LCD panel under the control of LCD driver circuitry.

Unfortunately, the prior art LCD devices suffer from the lack of ability to process color images for display. A need has therefore been felt for a color-image displayable LCD device for use with the pen-pointer input device permitting direct entry of input data and instructions.

SUMMARY OF THE INVENTION

It is therefore an object of the present invention to provide a new and improved LCD display scheme capable of avoiding the problem as faced with the prior art.

It is another object of the invention to provide an improved color image displayable LCD device while permitting direct entry of necessary data or instructions by use of an associated touch-sensitive pointing input device.

It is yet another object of the invention to provide an improved method of displaying color images on LCD devices while permitting direct entry of input data or instructions using an associated touch-sensitive pointer.

To attain the foregoing objects, the present invention provides an LCD device having a display panel with an array of picture elements or "pixels" organized into a matrix, capable of displaying an image as hand-drawn by use of a touch-sensitive pointing input device, featured in that the display device is arranged so that the image is displayable in more than one color thereon in response to operation of the pointing input device.

In accordance with another aspect of the instant invention, there is provided an LCD device including an LCD panel having an array of rows and columns of pixels defining a matrix, a position commander for determining a certain position for color display on the display panel, a coordinate detector for recognition of the certain position as determined by the commander and for generating and issuing an output signal indicative of a corresponding coordinate data, a color designator for designation of the kind of a color being selected for such color display, a memory device for storage of color data representative of the color as presently designated, a memory controller responsive to receipt of an address generated from the selected coordinate data for controlling the color data to be written into and read from the memory, and an output controller for allowing the color data read from the memory to be output onto the display panel as image data.

In accordance with still another aspect of the invention, the commander includes a pen-shaped touch-sensitive input device for use in drawing any desired locus being subject to color display on the display panel, while the coordinate detector includes a recognition function module for recognizing the locus drawn by the pen pointer thereby to provide an output being issued as X- and Y-coordinate data corresponding to the pixel dots on the display panel.

In accordance with a further aspect of the invention, the recognition function module may include a pressure sensor, an electrostatic sensor or a heat sensor.

In accordance with a yet further aspect of the invention, the color designator is comprised of a color designation area as provided in advance for a respective one of colors on the display panel permitting selection of any desired color in response to the commander. With the invention also, the color designator may be a color selection menu allowing the operation mode to be set in a color selection mode and permitting selection of a desired color through the color selection mode. The display panel may be of the active matrix type having thin-film transistors (TFTs) disposed at the pixels thereon.

In accordance with a still further aspect of the invention, there is provided a method for displaying a color image on an LCD panel with a matrix of rows and columns of pixels by using a pen-like touch-sensitive input device operatively associated therewith, which method includes the steps of designating a color to be displayed in advance, drawing on the display panel a locus being color-displayed by use of the pen pointer input device, providing the address of an associated data storage device based on the resulting coordinate data corresponding to the locus drawn, writing the selected color data into the storage device at the designated address thereof, and reading color data from the storage device thereby generating and issuing the same to the display panel as image data.

In accordance with the invention, the LCD panel has a matrix of rows and columns of pixels. To display a color image, a color designation means acts first to designate or determine the color to be displayed. This color designation may be performed by execution of pointing one of color designation areas each predefined for the individual color on a display panel; or alternatively, the same may be attained by setting the operation mode in a color selection mode through operation of a color selection menu.

Then, a position commander unit operates to instruct a specific position being subject to such color display on the display panel. More practically, the commander may be a touch-sensitive pointing input device, which is generally known as a "pen pointer" tool. This pen pointer is for use in drawing any desired line of locus to be color-displayed on the LCD panel screen. Each position designated by the commander is next recognized by a coordinate detector unit, which generates and issues corresponding coordinate data at an output thereof. The coordinate detector includes a recognizer for recognition of the locus as drawn or defined by movement of the pen pointer in such a way that the detector issues an output of recognizer as data indicative of X- and Y-coordinates corresponding to pixels or dots on the display panel. The recognizer here may be a pressure sensor, electrostatic sensor, heat sensor, or the like.

A storage controller unit is responsive to receipt of the resulting coordinate data for generating and issuing an address selected. Based on the address, the controller also serves to control read/write operations of color data with respect to a memory associated. The color data stored in the memory is then read out under the control of the storage controller to be supplied as video data to the display panel. In this way, it becomes possible to display a color image by use of pen input device.

These and other objects, features and advantages of the invention will be apparent from the following more particular description of one preferred embodiment of the invention, as illustrated in the accompanying drawings.

BRIEF DESCRIPTION OF THE DRAWINGS

FIGS. 3(a) to 3(c) depict some models of the contents of a memory in the LCD device shown in FIG. 1.

FIG. 4 illustrates a configuration of table data as stored in a color designator circuit of the embodiment of FIG. 1.

DETAILED DESCRIPTION OF THE INVENTION

Figure 1:
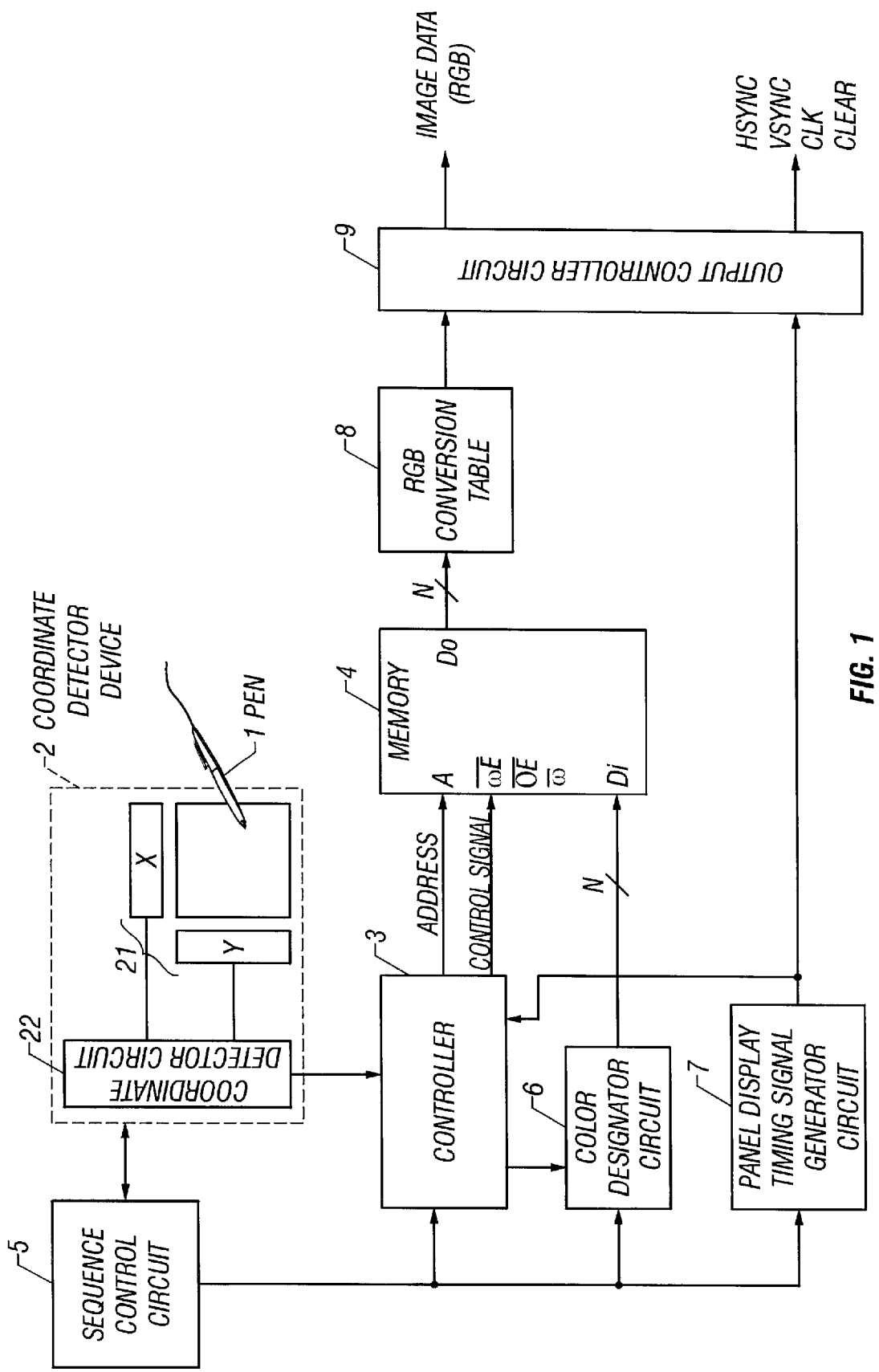
FIG. 1 is a block diagram showing an overall configuration of a color LCD device in accordance with one embodiment of the invention.
Figure 5:
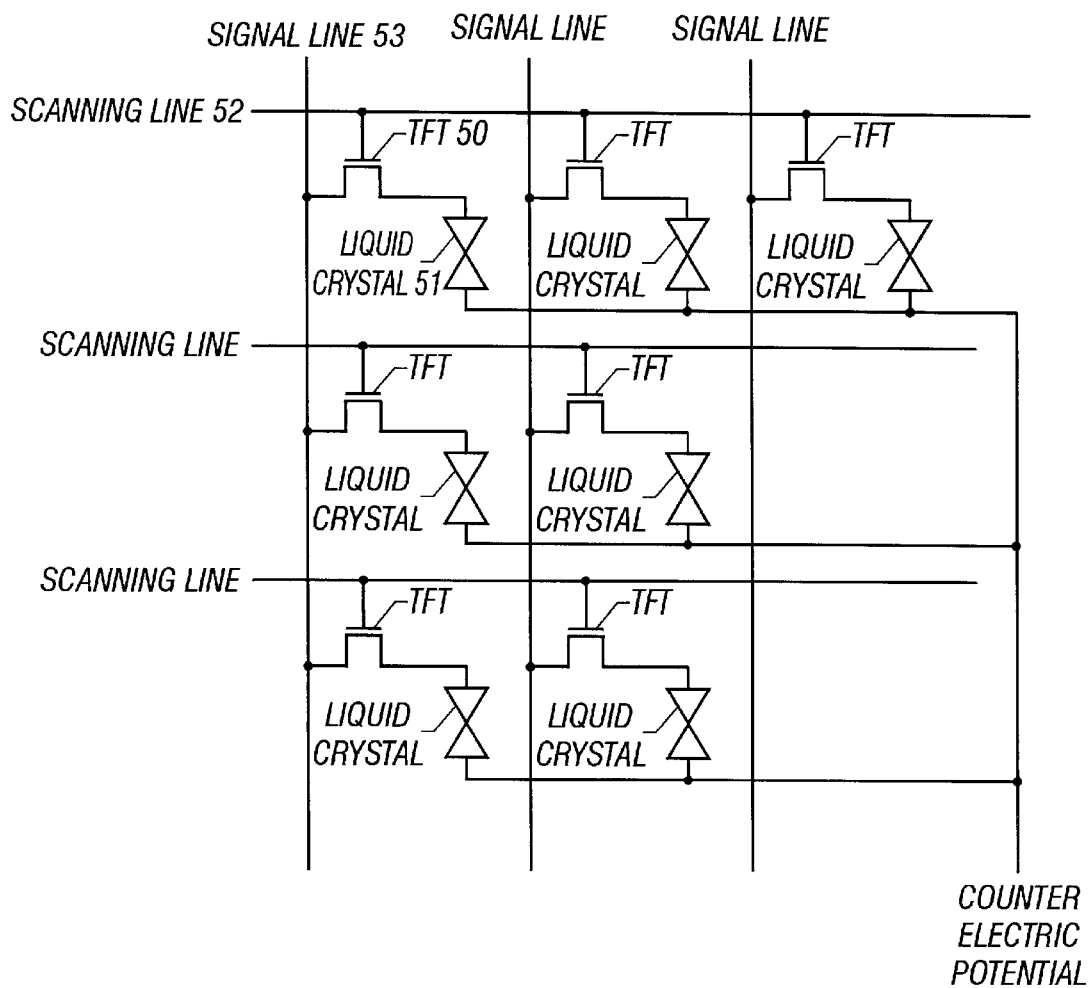
FIG. 5 shows a configuration of electrical circuitry of an LCD panel as employed in the FIG. 1 embodiment.

Referring to FIG. 1, a liquid crystal display (LCD) device in accordance with one preferred embodiment of the invention includes an LCD panel with a matrix of rows and columns of picture elements or "pixels," which may also be called the "dots" in some cases. The LCD panel comes with a coordinate detector device 2 for detection of coordinates as input by an associated pen-shaped touch-sensitive pointing input device known as an "input pen" or "pen pointer" in the art. Here, the LCD panel is of the active-matrix type which may be configured as shown in FIG. 5. As shown, the active-matrix LCD panel incorporates a matrix of pixels, each of which is at a corresponding one of cross points or intersections between horizontal scanning lines 52 and vertical signal transmission lines 53. The individual pixel includes therein a switch element 50, which selectively turns on and off controlling adequate transfer of image information to an associative display medium. This medium may be a liquid crystal material 51. The switch element may be a three-terminal element, typically a thin-film transistor (TFT) having the gate, source and drain electrodes. The scan lines 52 are connected to the gates of TFTs 50, whereas the signal lines 53 are to the sources (or drains) thereof.

As shown in FIG. 1, the coordinate detector 2 includes a pair of X/Y-coordinate recognition sensors 21 for recognition of the position of an arbitrary point as presently designated by the input pen 1, by detecting the X- and Y-coordinates thereof on the LCD display panel. The detector 2 also includes a coordinate detector circuit 22, which is responsive to receipt of the recognition data as derived from the X/Y-position recognition sensors 21 for generating and issuing at the outputs X- and Y-coordinate data that correspond to dots on a one-to-one correspondence basis. The sensors 21 may be pressure sensors, electrostatic sensors, heat sensors, or the like.

The coordinate detector 22 is connected to a memory controller circuit 3. This controller is to perform physical address settings and read/write control for an associative memory device 4 (described later). More specifically, the controller 3 generates and issues a physical address(es) for data write in memory 4 in response to the coordinate data (X- and Y-coordinate data) as detected by coordinate detector 22. Controller 3 also receives information sent from a sequence controller circuit 5 (later described) to generate when data write a write command signal such as write enable (WE) at a certain timing. During read mode, controller 3 attempts to control data read operation at memory 4 by providing physical address control for display on the LCD panel and generating a necessary signal (control signal) therefor.

The memory controller 3 is connected to the memory 4 and also to a color designator circuit 6 and a panel display timing signal generator circuit 7. The coordinate detector 2, memory controller 3, color designator 6 and timing generator 7 are connected to the sequence controller circuit 5 so that they operate under the control of it. Memory 4 is connected through an RGB conversion table 8 to an output controller circuit 9. The panel display timing generator 7 is also connected to output controller 9.

Figure 2:
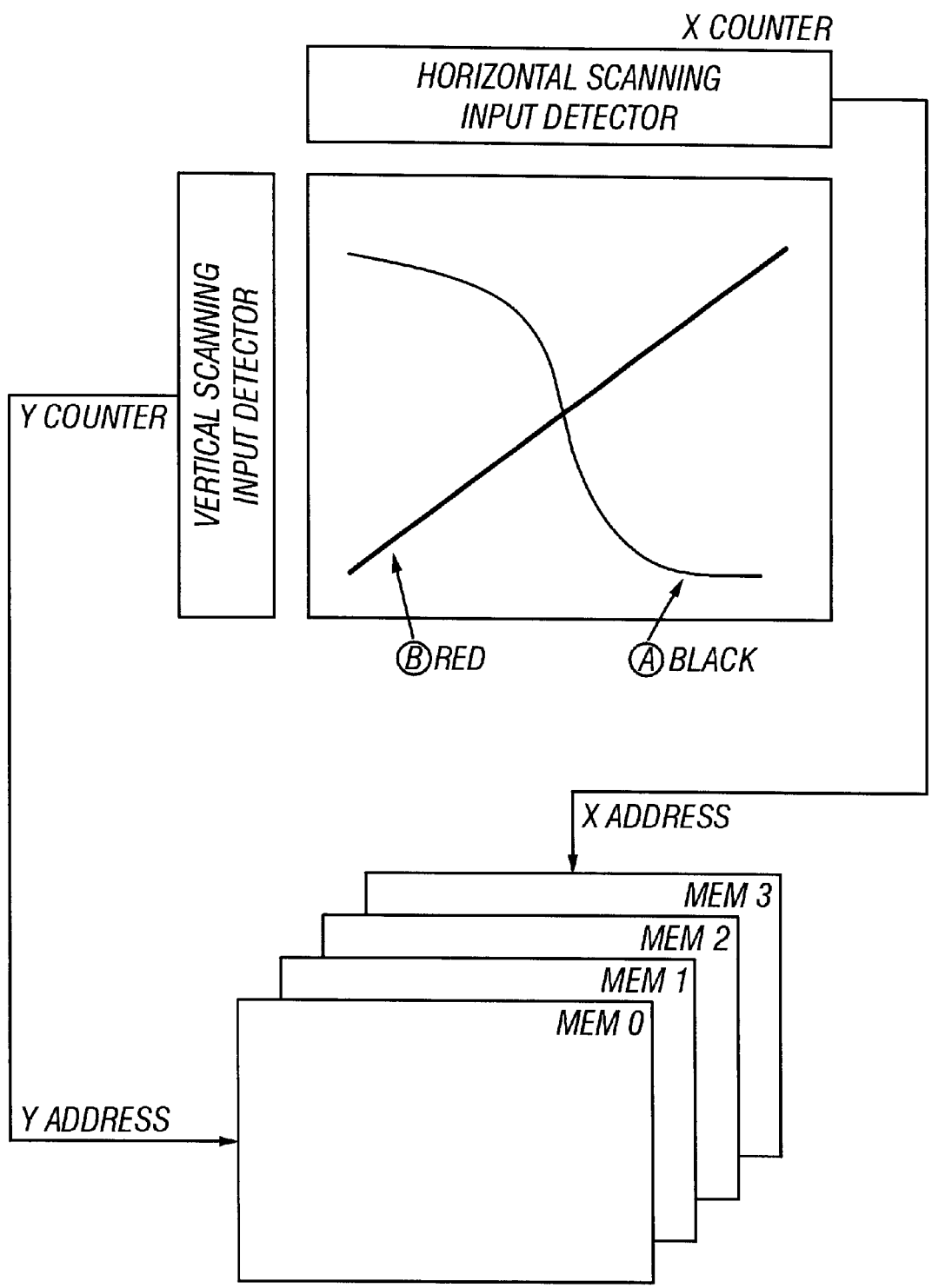
FIG. 2 is a diagrammatical representation for explanation of a color data storage scheme as employed in the LCD device of FIG. 1.

The memory 4 has in its memory space a prescribed number of addresses as equivalent in number to the resolution of the display panel, namely, equal to the total number of pixel dots thereon. Memory 4 can store therein N-bit data enabling handling of $2^N$ colors of image data. By way of example, in cases where sixteen (16) different colors are required for display, the memory is designed to be 4-bit data storable memory. Further, memory 4 has N sets of storage regions; for example, in the case of 16 different colors, it is designed to have four sets of storage regions MEM0, MEM1, MEM2, MEM3 as shown in FIG. 2, each of which can store therein 4-bit data separately. Note here that FIG. 2 diagrammatically represents a model of the operational correlation of coordinate detector 2 and memory 4.

The color designator 6 operates when predefined color selection (designation) coordinates are pointed on the LCD display panel to set a certain color data corresponding to the presently pointed color thereon. Here, the "color designation coordinates" may refer to an area as provided on the LCD display panel for the individual color. For instance, in cases where sixteen (16) colors are needed for display, 16 separate areas are provided on the panel, each of which is associated with a corresponding one of such colors required. With such an arrangement, selecting any desired color becomes available by execution, using pen 1, of "pointing" color designation coordinates (color distinction area) as desired for color display.

It should be noted here that the color data may be specific data variable in value from zero (0) to $2^{N-1}$ that can be handled or processed by memory 4 with N sets of storage regions. For example, in the situations where 16 different colors are to be implemented for use, the data is designed to have any value as selected from "0" to "15" that can be handled by memory 4 with four sets of storage regions MEM0–MEM3. The color designator 6 has one exemplary built-in table as shown in FIG. 4. This table shown is for use in 16-color display schemes; for example, when a "black" is selected based on the color selection coordinates, a corresponding digital color data "1111" is set. Alternatively, when a "red" is designated due to color designation coordinates, a color data "0001" will be set. In such cases, allocation between colors and color data items may be determined in an arbitrary manner.

In the illustrative embodiment the color selection coordinates (color distinction area) are arranged on the LCD display panel enabling selection of any desired color for display by use of the "pen-pointing" techniques; this may alternatively be modified such that an exclusive color selection menu is provided at a selected position on the display screen allowing users to operate it to attain selection of any color for display. In other words, operating the color selection menu causes the screen to change in operation mode so that it is set in a color selection mode for permission of color selection by way of such resultant color selection screen. This may advantageously avoid the need of providing in advance the color distinction areas on the LCD display panel enabling more efficient use of display screen in area.

The panel display timing generator 7 functions to generate and issue at its output a write synchronization (sync) signal, an operation clock signal, a reset command signal (an initializing signal) and others for the LCD display panel, memory controller 3, and output controller 9. The RGB conversion table 8 is for conversion of data read from the memory 4 into corresponding actual color data during display operation of the LCD panel. Output controller 9 operates to provide retiming, digital-to-analog (D/A) conversion and level-shift operations of video data and display control signals.

In the embodiment thus arranged, a color selected by use of either the color selection coordinates (color distinction area) or the color selection menu on the LCD panel screen is converted by the color designator 6 to a corresponding color data, which is then stored in respective storage regions of the memory 4. By way of example, assume that sixteen (16) different colors are available for display: in this case, resultant color as selected through operation of the color selection coordinates (color distinction area) or the color selection menu is converted using the table (see FIG. 4) of color designator 6 into 4-bit color data, and is then stored in a respective one of the storage regions MEM0–MEM3 of memory 4 shown in FIG. 2.

The color data stored in the memory 4 in this way is thereafter read out of it under the control of memory controller 3 to be sent forth to the RGB conversion table 8. RGB conversion table 8 is rendered operative to convert the input color data to RGB data for actual display on the LCD panel screen, which is then passed to the output controller 9. Output controller 9 attempts based on a signal(s) from the panel display timing generator 7 to display such RGB data on the LCD panel as video information. In this way, any desired color display is available in responding to input by pen 1.

The operation of the illustrative embodiment will be described in detail as follows.

The following description assumes that sixteen (16) different colors are employed for display. Imagine that as shown in FIG. 2, a curvature line A is to be displayed in "black" whereas a straight line B is in "red" on the LCD screen. Consider here that the display screen is initially displayed in "white" as its background color.

Under the above condition, the memory 4 has four sets of separate storage regions MEM0-MEM3 as shown in FIG. 2, while the content of color data being stored in each region is shown in FIGS. 3A to 3C. FIG. 3A shows the initial condition of such storage regions MEM0–MEM3, all of which store therein logic data "0" since the LCD background color is "white" as mentioned previously. FIG. 3B illustrates the storage contents of respective regions MEM0–MEM3 as observed just after completion of pen-input of the curve A of FIG. 2, whereas FIG. 3C depicts the contents of regions MEM after pen-input of the straight line B of FIG. 2.

First, the operator designates in advance his or her desired color to be displayed on the LCD screen. This color designation is attained either by execution of "pointing" the color designation coordinates (color distinction area) or by using a color selection menu as displayed on the screen.

Since this example assumes that the curve A is first displayed in "black," the operator selects the "black" by pointing the color designation coordinates or by making use of the color selection menu. The resulting color selected is then converted by the color designator 6 into color data. Practically, such designated color is converted using the conversion table (see FIG. 4) and is sent forth as output data. In this case, the "black" is converted into a 4-bit digital signal "1111."

After completion of the color designation for display in the foregoing way, the operator then uses the input pen 1 to draw his or her desired locus on the LCD display panel. In this example the curve A is hand-drawn on the display panel. The resulting locus as drawn on the display panel is output by the coordinate detector 2 as appropriate coordinate data (the data representative of X- and Y-coordinates), and thereafter is input to the memory controller 3. In responding to this, memory controller 3 generates and issues at its output physical addresses based on the input coordinate data, attempting to sequentially write color data into memory 4 at such addresses generated. The entire storage space of memory 4 is divided into four regions MEM0–MEM3 allowing the 4-bit color data to be written into these regions MEM. The result of such data write into regions MEM is demonstrated in FIG. 3B.

Then, for display of the straight line B in "red" on the LCD panel, the operator selects the "red" through pointing of the color designation coordinates (color distinction area) or using the color selection menu. Any resultant color selected is then converted by the color designator 6. In this case the selected color is converted by the conversion table (see FIG. 4) into 4-bit color data "0001."

After completion of the color designation for display, the operator attempts to hand-draw using the input pen 1 his or her desired locus, namely, line B of FIG. 2 for example on the LCD display panel. The locus drawn is output by the coordinate detector 2 as X/Y-coordinate data and is then supplied to the memory controller 3, which generates and issues at its output physical addresses sequentially writing color data into memory 4 at such addresses generated. Practically, the 4-bit color data "0001" is stored in four regions MEM0–MEM3 of FIG. 2, respectively. The result of such data storage in regions MEM is presented in FIG. 3C.

The resultant color data bits as stored in the memory 4 are later read sequentially from it under the control of memory controller 3 to be supplied in this order to the RGB conversion table 8. RGB conversion table 8 automatically converts the input color data to corresponding RGB data, which is then fed to the output controller 9. Output controller 9 executes D/A conversion for the RGB data as input thereto deriving at its output an analog color video signal, which is then supplied to the LCD panel. In this way, the pen-input locus patterns (curve A and straight line B) are finally displayed on the LCD screen in the operator's designated colors,e.g., "red" or "black" in this case.

It will possibly be desired that the locus patterns are in other colors. If this is the case, the aforesaid operation will be repeated while the operator occasionally selects his or her preferred color(s) by execution of pointing the color designation coordinates (color distinction area) or using the color selection menu available at every step for color selection.

As necessary, an extra selection menu for selection of the background color and line colors may be additionally arranged on the display panel. To attain such background-color designation, it should be required that a presently designated color data be written into the memory 4 at corresponding addresses thereof. This may be accomplished by employing a specific scheme as follows: reading data out of memory 4, and replacing the "old" data being previously stored at an address of the background color data before such background color designation with the updated background color data as presently selected. This data replace scheme may be attained using either one of an exclusive hardware arrangement and software programs.

In addition, while the illustrative embodiment has been described under the assumption that it is applied to the case of 16-color images based on 4-bit data, this invention is not exclusively limited thereto, and may be modified in arrangement to be applicable for any other cases requiring an increased number of colors for display. Furthermore, the pen-input technique as employed in the embodiment may be replaced with any other functionally equivalents, including the use of a multi-layered panel structure with the pen-input panel being stacked on the display panel, the use of a common panel structure allowing a panel to function both as the display screen and as the pen-input sheet.

It has been described that the present invention can provide the LCD display device permitting pen input on its display panel and the display method therefor.

What is claimed is:

1. A method for displaying a color image on a liquid crystal panel including a plurality of pixels located in a matrix, said method comprising the steps of:

selecting a color by pointing a first position with a pointing device in a color selecting portion on the liquid crystal panel;

detecting the first position on the liquid crystal panel by a detector;

converting the color into color data by a color designator circuit;

storing the color data in N storage regions of a memory device where each of the N storage regions has a number of addresses equal to a number of pixels in the matrix, so that $2^N$ colors are addressed for the liquid crystal panel;

pointing a second position with the pointing device on the liquid crystal panel after selecting the color;

detecting the second position on the liquid crystal panel by the detector;

outputting the position as an output signal having X-coordinate data and Y coordinate data;

generating a first address from the X-coordinate data and Y-coordinate data;

converting the color data into video data; and displaying the video data by an output circuit in accordance with the first address.

2. A method according to claim 1, wherein said detector is at least one selected from the group consisting of a pressure sensor, an electrostatic sensor and a heat sensor.

3. A method according to claim 1, wherein each of the plurality of pixels includes a thin film transistors as a switching element.

4. A method according to claim 1, wherein said output circuit operates to provide retiming, digital/analog conversion and level shift operations of the video data and display control signals.

5. A method according to claim 1, wherein said pointing device is a pen pointer.

6. A method for displaying a color image on a liquid crystal panel including a plurality of pixels located in a matrix, said method comprising the steps of:

selecting a color by operating a color selecting menu in a color operation mode, said color selecting menu being provided on the liquid crystal panel;

converting the color into color data;

storing the color data in N storage regions of a memory device where each storage region has a number of addresses equal to a number of pixels in the matrix;

pointing the position with the pointing device on the liquid crystal panel after selecting the color;

detecting the position on the liquid crystal panel by a detector;

outputting the position as an output signal having X-coordinate data and Y-coordinate data;

generating a first address from the X-coordinate data and Y-coordinate data;

converting the color data into video data;

displaying the video data by an output circuit in accordance with the first address, wherein $2^N$ colors are addressed for the liquid crystal panel.

* * * * *